Nov. 8, 1966 P. B. FAIRMAN ETAL 3,284,670
GROUND FAULT RESPONSIVE CONTROL MEANS FOR AN ELECTRIC
CIRCUIT RECLOSER OR THE LIKE
Filed June 17, 1963 2 Sheets-Sheet 1
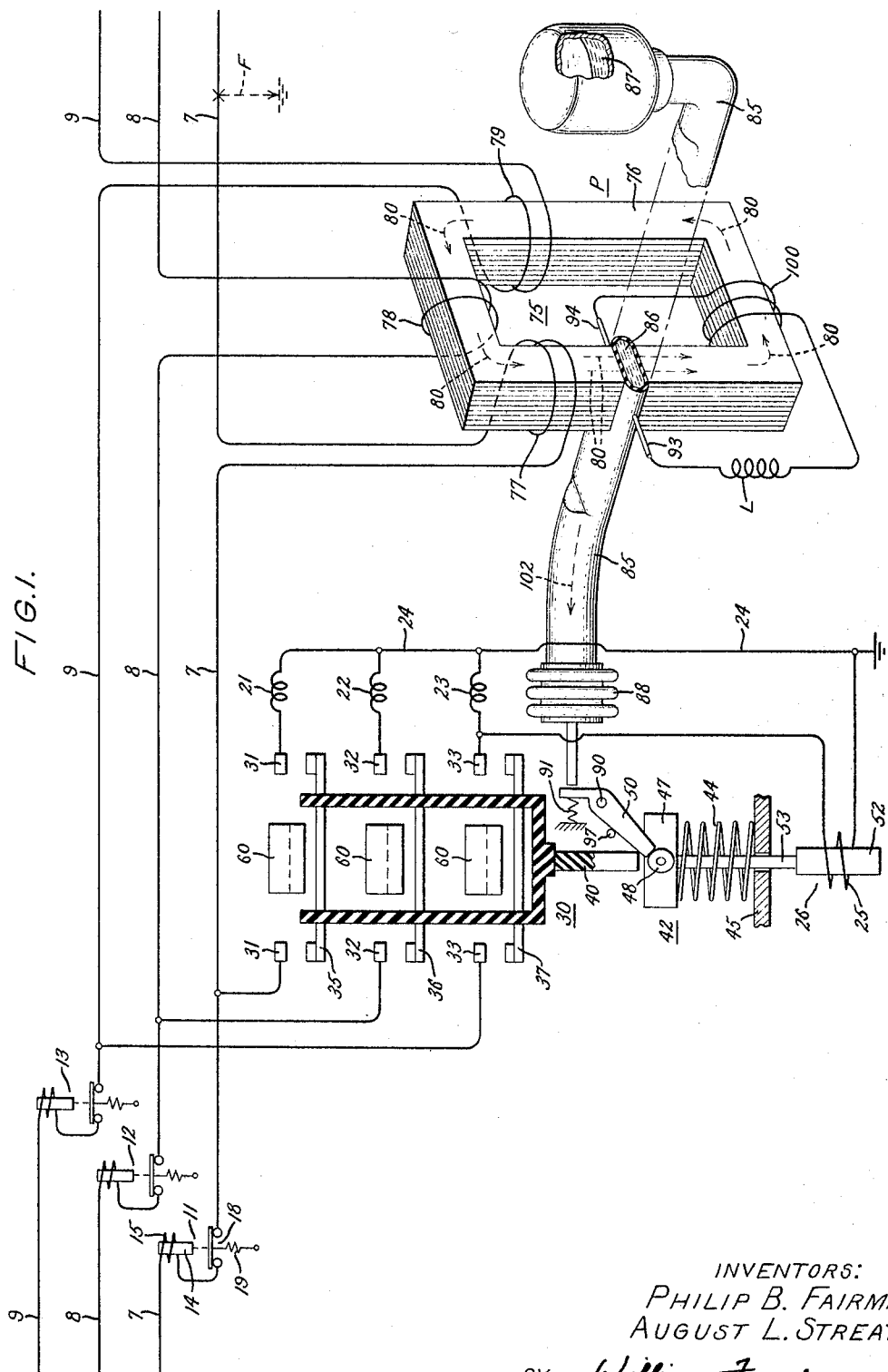
INVENTORS:
PHILIP B. FAIRMAN,
AUGUST L. STREATER
BY William Freedman
ATTORNEY.

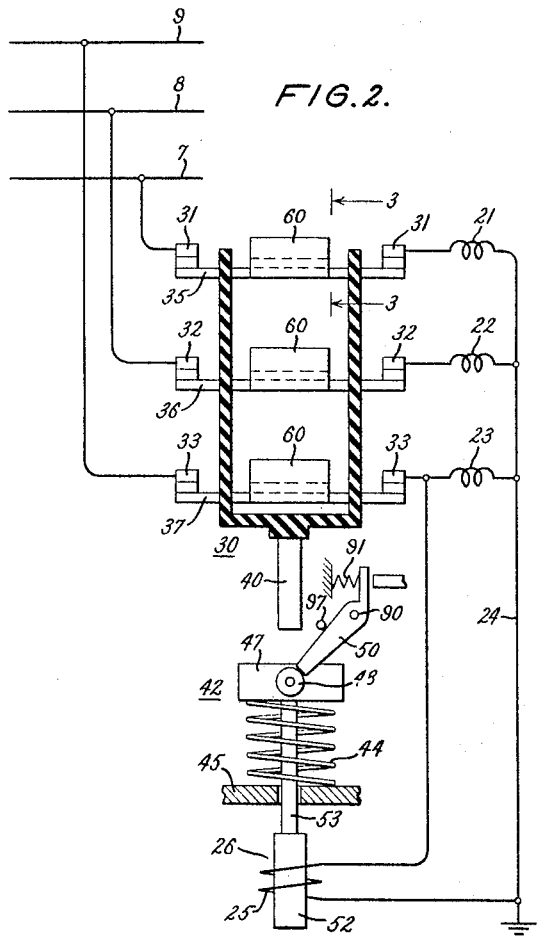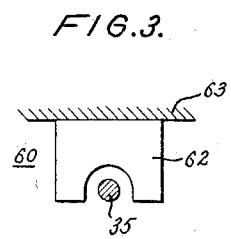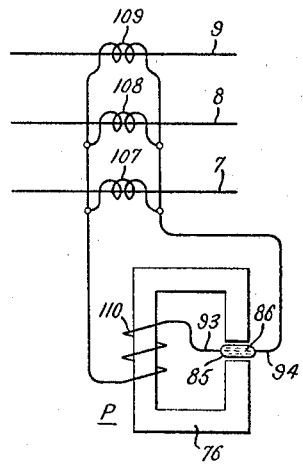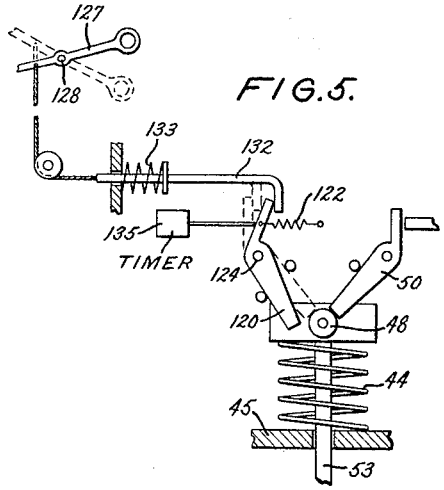

United States Patent Office 3,284,670
Patented Nov. 8, 1966

3,284,670
GROUND FAULT RESPONSIVE CONTROL MEANS FOR AN ELECTRIC CIRCUIT RECLOSER OR THE LIKE
Philip B. Fairman, Media, and August L. Streater, Broomall, Pa., assignors to General Electric Company, a corporation of New York
Filed June 17, 1963, Ser. No. 288,186
14 Claims. (Cl. 317—47)

This invention relates to means for causing an electric circuit recloser to open in response to ground fault currents below the minimum pick-up current of the recloser. The invention is also concerned with means for controlling the operation of an electric switch in accordance with the zero-phase-sequence component of current in a polyphase A.-C. system.

The usual circuit recloser comprises a set of contacts that are controlled by an electromagnet having a winding connected in series with one phase of a polyphase power system. The force for opening the contacts is derived directly from the electromagnet. When the current flowing through the winding of the electromagnet exceeds a predetermined minimum value, the electromagnet responds by operating to open the contacts of the recloser. The typical recloser of this type is insensitive to ground fault currents of a value below the minimum current at which its electromagnet will operate, i.e., the minimum pick-up current of the recloser.

The usual scheme for sensing ground fault currents comprises an electric or magnetic circuit that is sensitive to an unbalance in the currents flowing through the phases of the power system. This component of current is commonly referred to as the zero-phase-sequence component of current in the system. With a circuit breaker that has a latch and a separate source of tripping power, it is a rather simple matter to cause the circuit breaker to open in response to a signal received from the zero-phase-sequence current sensitive device. The tripping power source is merely connected to the latch-operator in response to such a signal, and the latch-operator upon energization causes the latch to release the circuit breaker for opening under the influence of this opening spring.

But with a recloser of the type referred to hereinabove (i.e., with an electromagnet for supplying contact-opening force), there is no separate source of tripping power and no low energy control corresponding to the latch of the circuit breaker. Opening can ordinarily be effected only by energizing the winding of the opening electromagnet with sufficient current to cause it to drive the contacts open.

An object of our invention is to provide apparatus capable of causing such a recloser to open in response to ground fault currents below its minimum pick-up rating.

Another object is to provide apparatus capable of producing such a recloser-opening operation, yet which requires no separate source of power, but merely that power derived from the power system.

Another object is to render the recloser sensitive to these low current ground faults on each opening operation in a plurality of closely-successive opening operations, and still further to accomplish this result with apparatus that can be located closely adjacent the recloser rather than being limited to a location remote from the recloser.

Still another object is to provide a simple, inexpensive low input-force device for controlling the operation of an electric switch in accordance with the zero-phase-sequence component of the current in a polyphase A.-C. power system.

In carrying out our invention in one form, we provide a fault-imposing switching arrangement for a polyphase A.-C. power system. This switching arrangement comprises a normally open switch that can be closed to cause a predetermined overcurrent to flow through the system, and this overcurrent is used for operating an overcurrent sensitive recloser or similar circuit breaker. The switch is controlled by stored-energy means operable upon discharge to drive the switch into closed position. Latch means is provided for holding the stored-energy means in a charged condition and is releasable to effect discharge of the stored-energy means and resultant closing of the switch. The latch is released in response to a zero-phase-sequence component of current in the power system by means sensitive to such zero-phase-sequence component. The switch, upon closing, is held in its closed position while current flows therethrough by magnetic means that is energized by this current flowing through the switch. This current flowing through the switch also is used for recharging the stored-energy closing means. Means is also provided for opening the switch when the current flow therethrough ceases.

In a preferred form of our invention the latch-tripping means, or the latch-releasing means, comprises a conduit containing an electrically conductive liquid and a pressure-sensitive actuator connected to the conduit for producing a latch-releasing force in response to the reception of a predetermined quantity of fluid from the conduit. A magnetic core is positioned to direct magnetic flux transversely of the conduit. Means responsive to the zero-phase-sequence component of current in said system is provided for producing magnetic flux in said core substantially proportional to the magnitude of the zero-phase-sequence component of current. Means sensitive to this magnetic flux is provided for producing a control current substantially proportional to the magnitude of the flux and substantially in phase with the flux. This control current is conducted through the conductive liquid transversely to the path followed by said flux in transversing the liquid, and thus liquid is pumped through the conduit into the pressure-sensitive actuator at a flow rate varying as a power function of the zero-phase-sequence current component.

For a better understanding of our invention, reference may be had to the following description taken in conjunction with the accompanying drawings, wherein:

FIG. 1 is a schematic illustration of a ground fault sensitive control arrangement embodying one form of our invention. This control arrangement comprises a fault-imposing switch shown in its open position.

FIG. 2 shows the fault-imposing switch of FIG. 1 in its closed position with its closing operator in a reset condition.

FIG. 3 is a cross sectional view taken along the line 3—3 of FIG. 2.

FIG. 4 is a schematic illustration of a modified form of our invention.

FIG. 5 is a schematic illustration of another modified form of our invention.

Referring now to FIG. 1, there is shown a three phase A.-C. power system comprising phase conductors 7, 8 and 9. In series with each of these phase conductors is a single phase recloser. These reclosers are schematically shown at 11, 12 and 13. Each recloser comprises a solenoid 14 having an operating coil 15 and a set of normally closed contacts 18. When a current in excess of a predetermined minimum pick-up value flows through the coil 15, the solenoid operates to open its contacts 18 and interrupt the circuit. When the circuit is interrupted, the solenoid coil is deenergized and the contacts are reclosed by suitable closing spring 19. If the condition responsible for the overcurrent has disappeared when the contacts are reclosed, the contacts will remain closed. But if this condition is still present, the opening and reclosing operations will be repeated. If the fault persists, a predetermined number of these opening and reclosing operations will occur in rapid succession, after which the recloser will remain open, or locked-out. These opening and reclosing operations and the lock-out operation are timed and otherwise controlled in a well-known manner by suitable means such as shown in U.S. Patent 2,633,514—McCurry et al., assigned to the assignee of the present invention, or in U.S. Patent 2,560,529—Van Ryan et al. Since these controls form no part of the present invention and may be conventional they have not been shown in the drawing.

Typically, reclosers of the type shown in the above patents are insensitive to ground fault currents below the pick-up rating of the opening solenoid. For example, assume that a fault such as F occurs from phase conductor 7 to ground and the current resulting from such fault is below the pick-up rating of the solenoid 14 of the recloser. Then, in the absence of our invention, the solenoid 14 will remain inactive and the recloser contacts 18 would remain closed despite this fault current.

Our invention is concerned with rendering the recloser sensitive to such low magnitude ground fault currents. We accomplish this result by first sensing the presence of such a ground fault current and then establishing a low impedance circuit to ground from each phase of the power system when the ground fault current exceeds a predetermined value. The establishment of this low impedance circuit to ground results in an increase in the current through each phase to a value exceeding the minimum pick-up rating of the recloser. The solenoid of each recloser is capable of responding to this increased current and does so by opening the recloser contacts, as is desired.

The low impedance circuits to ground from each phase are established through current-limiting reactors provided for each of these circuits. These reactors are designated 21, 22 and 23. The reactor 21 is connected in the circuit that extends from phase 7 to ground; the reactor 22 in the circuit that extends from phase 8 to ground; and the reactor 23 in the circuit that extends from phase 9 to ground. These circuits are connected together on the ground side of the reactors and extend from this electrically-common point to ground via a conductor 24. The effective impedance of each of these reactor circuits is low enough to result in a current through each phase exceeding the pick-up rating of the recloser, but this effective impedance is high enough to limit the value of this current to a level that is harmless to the system. A preferred current that should flow through each phase when the reactors are connected to the power circuit is approximately three times the normal continuous rating of the reclosers. The reclosers are usually set to pick up at two times their normal continuous rating.

In the illustrated arrangement, each reactor 21, 22, 23 is arranged to be connected between its respective phase conductor and an electrically-common point that is at ground potential. It is to be understood, however, that the connection to ground can be omitted so that the electrically common point is not at ground potential. In such cases, it is possible to omit one of the reactors 21, 22, 23. We prefer, however, to employ three reactors of such impedance that substantially equal currents flow through the phase conductors when the reactors are connected in the power circuit, thereby causing the reclosers 11, 12 and 13 to open substantially simultaneously. In this latter regard, it is to be understood that the opening time for a recloser is customarily dependent upon current, and for substantially identical reclosers, such as 11, 12 and 13 equal currents will produce substantially simultaneous opening. To produce substantially equal currents in the three conductors when the reactors are connected in the circuit, the impedances at normal power frequency between each phase conductor and the electrically-common point should be substantially equal. To equalize these impedances, allowance must be made for the fact that a winding 25, soon to be described, is connected across the reactor 23.

The above described circuits to ground through the reactors 21, 22 and 23 are established by the closing of a switch 30. This switch 30 comprises a set of stationary contacts 31 connected in series with the reactor 21, a set of stationary contacts 32 connected in series with the reactor 22, and a set of stationary contacts 33 connected in series with the reactor 23. The switch further comprises three conductive cross bars 35, 36 and 37 which are electrically insulated from each other and are mechanically coupled together for movement in unison by means of a suitable insulating framework 39 comprising an operating rod 40 at its lower end. When the operating rod 40 together with the rest of the framework 39 is moved upwardly to close the switch 30, the movable conductive cross bar 35 moves into engagement with the stationary contacts 31 at its respective opposite ends, thus bridging the contacts 31 and completing a circuit through the contacts 31 and the reactor 21. This upward closing motion of rod 40 also drives the cross bars 36 and 37 into engagement with their respective stationary contacts and completes a pair of circuits therethrough. The cross bars 35, 36 and 37 are shown in their closed position in FIG. 2.

The force for closing the switch 30 is derived from a stored energy operator 42. This operator 42 comprises a compression spring 44 that is supported at its lower end on a stationary support 45 and bears at its upper end against a force-transmitting plate 47. The switch operating rod 40 is aligned with this force-transmitting plate 47 and is adapted to be driven upwardly by the force-transmitting plate when the force-transmitting plate moves upward. The force-transmitting plate 47 carries a latching roller 48 that cooperates with a suitable latch 50. When the latch 50 is in its position of FIG. 1, it restrains upward movement of the roller 48 and the force-transmitting plate 47, thus holding the spring 44 charged.

When the latch 50 is tripped, i.e., moved out of restraining relationship with the roller 48, the charged spring 44 is free to discharge. This it does by driving the force-transmitting plate 47 upwardly, carrying the switch operating rod 40 upwardly through a complete closing stroke. This closes the switch contacts and completes the above-described low impedance circuits through the resistors 21, 22 and 23.

For recharging the closing spring 44 immediately after this closing operation. We utilize the voltage developed across reactor 23 to provide a current through the coil 25 of a resetting solenoid 26. In this regard, part of the current that flows through contacts 33 flows through winding 25, energizes the solenoid, and drives its armature 52 in a downward direction. The armature 52 is connected to the force-transmitting plate 47 by means of a reset rod 54, and thus downward motion of the armature 52 drives the force-transmitting plate 47 downwardly to recharge the closing spring 44. When this recharging action has returned the force-transmitting plate 47 to its original position, the latch 50 falls in behind the roller 48 and thus prevents the spring 44 from again discharging until the latch 50 is tripped or released. The stored energy operator 42 is depicted at the end of such a recharging action in FIG. 2.

As shown in FIG. 2, the switch 30 remains in its closed position during recharging of the closing spring 44. For holding the switch 30 in its closed position of FIG. 2, we rely upon magnetic means 60 corresponding to that disclosed and claimed in Patent No. 3,065,317—Streater, assigned to the assignee of the present invention. This magnetic means 60, which is best shown in FIG. 3, comprises a U-shaped member 62 of magnetizable material that is suitably attached to a stationary support 63. The U-shaped member 62 has a recess therein that the cross bar 35 enters as it approaches closed position. As soon as cross bar 35 completes a circuit between the stationary contacts 31, current flows through the cross bar 35 and it develops magnetic flux about the cross bar that is utilized by the U-shaped member 62 to hold the cross bar in its closed position. As explained in more detail in the aforesaid Streater patent, the U-shaped member distributes the flux about the cross bar in such a manner that the flux density adjacent the top of the cross bar is much less than that adjacent the bottom of the cross bar. This flux distribution results in an upward force on the cross bar tending to hold it in its closed position. The magnitude of this force varies as a direct function of the square of the current flowing through the cross bar. The magnitude of this force is also dependent upon the width of the U-shaped member 62, as measured along the length of the cross bar. This width is made great enough so that the hold-closed force developed for any given current is greater than any forces present tending to force the contacts open. Thus, so long as current flows through the cross bar 35, there is a net force holding the cross bar 35 in its closed position.

It is to be noted that there is a magnetic means 60 associated with each of the cross bars 35, 36 and 37. Each one of these magnetic means is alone capable of holding the switch 30 closed if no current should be flowing through the other cross bars. Thus, if the reclosers 11, 12 and 13 should not open exactly in unison, the switch 30 will be held closed by the energized magnetic means 60 until the last of the reclosers 11, 12 or 13 opens. When current is flowing through more than one of the cross bars at any given instant, those magnetic means 60 which are energized by this current will supplement each other in providing a force for holding the switch closed.

As explained hereinabove, the reclosers 11, 12 and 13 begin an opening operation as soon as the switch 30 is closed. When the reclosures do open, current ceases flowing through cross bars 35, 36 and 37 of the switch 30, and the hold-closed force developed by the magnetic means 60 disappears. This permits the switch 30 to open under the influence of gravity. If desired, a light opening spring (not shown) can also be provided to assist in opening the switch. The opening speed need not be especially high since there is then no current flowing through the switch 30, and thus the switch need have no current-interrupting ability. This is one of the factors that permit the switch to be of a light-weight, inexpensive construction. Other contributing factors will be explained hereinafter.

For sensing the presence of the ground fault F so as to initiate the above-described closing of the fault-imposing switch 30 in response to ground fault current above a predetermined value, we rely upon a sensing device 75 that is responsive to the zero-phase-sequence component of the current in power system 7, 8, 9. This sensing device 75 comprises a C-shaped magnetizable core 76 and three windings 77, 78 and 79 respectively connected in series with the phase conductors 7, 8 and 9. Each of these windings 77, 78 and 79 surrounds a leg of the core 76. These windings have an equal number of turns and are arranged in such a manner that the flux developed in the core 76 by the current flowing through each winding is canceled out by the flux developed by current flowing through the remaining windings so long as the vector sum of the currents in the phases 7, 8, 9 is equal to zero. But should a fault such as F develop, this vector sum would no longer equal zero. There would be an unbalance of currents in the phases, and this would result in flux being developed in the core 76 proportional to this unbalanced current, which is commonly referred to as the zero-phase-sequence component of current in the circuit 7, 8, 9. This flux would follow a path through the C-shaped core such as generally depicted by the arrows 80 in FIG. 1.

This flux in core 76 is used for developing a mechanical force for tripping the latch 50 so as to initiate the above-described closing of the fault imposing switch 30. For developing this tripping force, an electromagnetic pump P is utilized. This pump P comprises a conduit 85 preferably of insulating material containing a conductive liquid 86 such as mercury. This conduit is located in a gap contained in the core 76. The right hand end of the conduit 85 communicates with a supply reservoir 87 and the left end communicates with an expansible bellows 88. The mercury in the reservoir 87 maintains the bellows and the conduit 85 filled with mercury at all times. When the mercury in the conduit 85 is pumped to the left into the bellows 88, it lengthens the bellows and forces a plunger attached to the left hand end of the bellows against the latch 50. This rotates the latch 50 about its pivot 90 in a counterclockwise direction against the bias of reset spring 91. This trips the latch to effect closing of the switch 30 in the manner described hereinabove.

In an electromagnetic pump, such as P, liquid is pumped through the conduit 85 when electric current is conducted through the conductive liquid 86 in a direction transverse to the magnetic field that traverses the liquid. Since the flux developed in the core 76 traverses the conductive liquid 86 in the direction indicated by arrows 80 across the gap, we can effect the desired pumping action by conducting current across the conductive liquid 86 between two electrodes 93 and 94. These electrodes 93 and 94 are located on an axis that is perpendicular to the direction of the magnetic field and is also perpendicular to the longitudinal axis of the conduit 85 in the region of the gap. These electrodes 93 and 94 pass through the insulating walls of the conduit so as to be in electrically conducting engagement with the conductive liquid. Thus, current flow between the electrodes will coact with the magnetic field traversing the gap as indicated by the arrows 80 to produce a pressure forcing the liquid along the axis of the conduit.

For supplying current to the electrodes 93, 94, we provide a winding 100 which encircles a leg of the core 76. The respective terminals of this winding 100 are electrically connected to the electrodes 93 and 94 through a reactance element in the form of inductance L. The flux developed in the core 76 by the zero-phase-sequence component of current resulting from fault F induces in the winding 100 a voltage that is proportional to the zero-phase-sequence component of current. This voltage produces a current through inductance L and the electrodes 93 and 94 that is essentially in phase with the flux in the core. Thus, a current proportional to this zero-phase-sequence component of current passes between the electrodes 93 and 94. The inductance L, it will be understood, causes the phase angle of the current in the circuit 100, 93, 86, 94 to be shifted substantially 90 degrees with respect to the voltage in this circuit, thus producing an in-phase relationship of this current with respect to the flux in core 76.

The direction which liquid will be pumped through the conduit 85 at any given instant depends upon the direction of current flow between electrodes 93 and 94 and the direction of the flux traversing the conduit at this instant. In the illustrated pump P, the direction of current flow is so selected relative to the direction of the flux that pumping is always in the direction indicated by the arrow 102, i.e., toward the bellows 88. The current flowing between electrodes 93 and 94 is maintained in phase with the flux, as described hereinabove, so that changes in the direction of current at the end of each half cycle are compensated for by corresponding changes in the direction of the flux. As a result, the pumping action continues in the direction of arrow 102 despite changes in the direction of the current flowing between electrodes 93 and 94.

The rate of liquid flow through the conduit 85 is approximately proportional to the product of the flux traversing the conductive liquid 86 and the current flowing between electrodes 93 and 94. Since both of these quantities are proportional to the zero-phase-sequence component of current, it will be apparent that the flow rate through the conduit is approximately proportional to the square of the zero-phase-sequence component of current. The liquid flowing through the conduit 85 encounters a certain amount of turbulence which tends to modify its flow rate, but this and similar influences can be minimized by avoiding abrupt flow restrictions and abrupt changes in direction in the conduit. We have minimized these influences to such an extent that the flow rate varies in accordance with a power function of the zero-phase-sequence current that is only slightly less than two. The flow rate may therefore be stated to be proportional to $I^n$ where $I$ is the zero-phase-sequence current and $n$ is a constant slightly less than two. The time required for lengthening the bellows sufficiently to trip the latch 50 is inversely proportional to the flow rate through the conduit 85. Since flow rate is proportional to $I^n$, the time required for tripping will therefore be inversely proportional to $I^n$.

The reason for operating the switch 30 with a time delay that varies inversely with respect to approximately the square of the current is to provide for coordination of the reclosers 11, 12 and 13 with other protective devices that might be connected in the power system. These other protective devices customarily have time delay characteristics that vary inversely with the square of the current, and to coordinate with the devices, it is desirable to have a time current curve that generally parallels their time current characteristic curve.

For requiring that the zero-phase-sequence component of current exceed a predetermined amount before the pump becomes effective to lengthen the bellows 88, we rely upon the reset spring 91. This reset spring 91 acts in a direction opposite to the pumping direction of the pump P and provides an initial bias that pump P is incapable of overcoming so long as the zero-phase-sequence component of current is below a predetermined value. But when this value is exceeded, the pump P becomes effective to overcome spring 91 and to thus lengthen the bellows and drive the latch in a counterclockwise tripping direction. For varying this minimum pick-up value, the windings 77, 78 and 79 are preferably provided with taps (not shown) that can be adjusted to change the effective number of turns of each winding. In selecting a value of pick-up current for the pump P, it is important to select a value higher than the zero-phase-sequence component expected to be encountered with normal unbalances in phase current in the power system. This pick-up value for the pump P should, of course, be substantially below the pick-up value for the reclosers 11, 12 and 13 if protection is to be provided against ground fault current below the pick-up setting of these reclosers.

As soon as the switch 30 closes in response to tripping of latch 50 by the pump P, the zero-phase-sequence component of current drops to a very low value due to the low impedance paths established to ground ahead of the windings 77, 78, 79. This reduces the pressure developed by the pump P to such an extent that the reset spring 91 can return the latch to its position of FIG. 1 against a stop 97, forcing liquid out of the bellows 88 and back through the conduit 85 into the reservoir 87 in the process. Accordingly, when the reset solenoid 26 recharges the closing spring 44 shortly after the switch 30 is closed, the latch 50 is then capable of restraining the spring 44 in its charged condition upon deenergization of the reset solenoid 26.

If the fault F is still present when the reclosers 11, 12 and 13 reclose, then the fault-imposing switch 30 will again close and initiate an opening of the reclosers in the same manner as described above. Each time the switch 30 closes in this manner, it causes sufficient current to flow through its reset solenoid winding 25 to recharge the closing spring 44. If the recloser should finally lock out because the fault F is of a permanent nature, the closing device will have reset just prior to the recloser opening operation that produced lock out. When the recloser opens upon lock out, the switch 30 will drop open and the switching arrangement will therefore be in its fully reset condition shown in FIG. 1. It will be apparent that our switching arrangement is capable of performing in its intended manner on every recloser operation up to lock out and does this without requiring a sequencing device of its own.

It will be recalled that one of the objects of our invention is to produce the desired response of the reclosers 11, 12 and 13 with a device having low energy requirements and no need for separate power source. There are a number of factors that enable us to attain these objects. First of all, the latch 50 may be a lightly loaded latch because the closing spring 44 may be relatively light. This is the case because the spring 44 is not required to close the switch 30 against heavy currents. All that is required from the spring 44 is that it move the cross bars 35, 36, 37 into a position to initiate current flow through the switch. As soon as this occurs, the magnetic means 60 is energized to complete the closing operation and to maintain the switch closed so long as current flows therethrough. Moreover, the reactors 21, 22 and 23 limit the current that flows through the switch to a relatively low value so that even if the spring 44 had to be relied upon for some assistance in closing, it would not have to overcome very much opposing magnetic force resulting from current flow through the switch. To shorten the closing stroke of the switch 30 and to assure that the switch is very close to closed position and physically within the range of magnetic means 60 when current flow is initiated during closing, we prefer that the switch be submerged in oil. This oil, because of the high dielectric strength, prevents an arc from striking between the contacts before the contacts are very close together during the closing operation.

The fact that the switch is called upon to carry currents no higher than about three times the normal continuous current rating of the reclosers 11, 12 and 13, and then for only a short period, enables us to use simple light weight parts for the switch conductors and their supports. This further reduces the energy required from the closing spring 44 to effect a closing operation.

Another factor contributing to the low input-force requirements of our switching arrangement is that the electromagnetic pump P can provide a high amplification of the input force supplied thereto. By making the effective cross section of the bellows large in comparison to the cross-sectional area of the pump in the gap region, its force-amplification factor can be made on the order of a hundred or more to one. Thus, very little force needs to be introduced by the pump P into the control system in order to effect tripping of the light switch-closing spring 44.

It will be apparent that all of the power for controlling the switch 30 is derived from the power system 7, 8, 9, thus obviating the need for any separate power source. In this regard, note that the power for tripping the latch 50 is derived directly from the power system through the electromagnetic pump P and its series windings 77, 78, 79; the energy for holding the switch 30 closed is derived from the power system through the electromagnetic means 60; the energy for recharging the closing spring 44 is derived from power supplied directly from the power system through conductor 24 upon closing of the switch 30. Thus no separate power source is needed for controlling the switch 30 in the desired manner. It is to be understood, however, that our invention in its broader aspects is not limited to a control arrangement that is devoid of separate power sources.

It is to be further noted that our control arrangement can be located immediately adjacent the reclosers 11, 12 and 13 and does not require a remote location for successful operation. This enables maintenance and inspection to be more easily carried out and also enables us to sense low current ground faults in a larger part of the system than would be the case with any apparatus further out on the line and remote from reclosers 11, 12 and 13.

Although we use the electromagnetic pump P for controlling a switch 30, our invention in certain of its broader aspects, comprehends using the pump P for effecting other control operations in response to a zero-phase-sequence component of current in excess of a predetermined value.

In the arrangement of FIG. 1, we energize the core 76 of the electromagnetic pump P directly from windings connected in series with the phases 7, 8 and 9 of the power system. This advantageously eliminates the need for current transformers and their added costs, but there will be applications where this cost factor is not of controlling importance. In such applications we can rely upon the arrangement shown in FIG. 4. Here current transformers 107, 108 and 109 are provided, one for each of the three phases 7, 8 and 9, and the secondaries of these current transformers 107, 108 and 109 are connected in parallel in what amounts to a zero-phase-sequence current-sensitive network. Across the terminals of this parallel combination, we connect the series combination of a winding 110 and the electrodes 93 and 94. The winding 110 encircles one leg of the core 76 of electromagnetic pump P, and the electrodes 93 and 94 are on opposite sides of the mercury column for the pump, the same as shown in FIG. 1. The current transformer secondaries 107, 108 and 109 have an equal number of turns, and their polarities are so selected that no current flows through the pump winding 110 and electrodes 93 and 94 so long as the vector sum of the phase currents is equal to zero. But should a fault to ground develop from one of the phase conductors, this vector sum will no longer equal zero, as explained hereinabove. There will be an unbalance of current in the phases, and this will result in a current flowing through the winding 110 and electrodes 93 and 94 substantially proportional to the magnitude of the zero-phase-sequence component of current in the power system 7, 8, 9. When this current through winding 110 and across the mercury column 86 exceeds a predetermined value, mercury will be pumped by the pump P through the insulating conduit 85, as explained in connection with FIGS. 1 and 2, to trip the latch 50. The flux developed by winding 110 is substantially in phase with the current across the mercury column, and hence pumping action is unidirectional. The pumping direction is toward the bellows 88, as described in connection with FIG. 1. Since both the flux in the core 76 and the current flowing across the mercury column are proportional to the zero-phase-sequence component of current in the power system, mercury 86 will be pumped at a velocity approximately proportional to the square of the zero-phase-sequence current component, and the time required for tripping of latch 50 will be inversely proportional to approximately the square of the zero-phase-sequence current component or, more precisely, will be inversely proportional to $I^n$, as this expression is used hereinabove.

If one or more of the reclosers 11, 12, or 13 locks out, say in response to a persistent fault or a manual lock-out operation, and is thereafter returned to the line after a prolonged period, initial energization of the line might result in a rather large zero-phase-sequence component of current even though there is no ground fault present. This condition might typically result from imbalances in phase current due to different single phase loads drawing disproportionate amounts of current during starting. The recloser should not open in response to this zero-phase-sequence current during this initial period since this current will ordinarily subside as the loads are started and brought up to speed.

To prevent the reclosers from opening under these conditions in response to zero-phase-sequence current, we block closing of the fault-imposing switch 30 for a predetermined time following return of the recloser to the line after lockout. Referring to FIG. 5, this is done by providing an auxiliary latch 120 that cooperates with the latching roller 48. The auxiliary latch 120 is normally maintained in a disabled position by means of a tension spring 122 that biases the latch 120 in a clockwise direction about its stationary pivot 124. But when the recloser locks out, the latch is driven counterclockwise into a latching position ahead of the latching roller 48 to block release of the closing spring 44 so long as the latch remains in its latching position.

For driving the auxiliary latch 120 into its latching position, we rely upon motion of the usual handle 127 of one of the reclosers 11, 12 or 13. This handle 127 has a normal position shown in solid lines in FIG. 4, where it remains so long as the recloser is not locked out. But when the recloser does lock out, this handle moves clockwise about its stationary pivot 128 from its solid line position into its dotted line position in a manner typical of a recloser. This motion of the lockout handle 127 is transmitted to the auxiliary latch 120 by means of a suitable linkage comprising a hook-shaped actuator 132 and a cable 130 connected at its respective opposite ends to the handle 127 and the actuator 132. When the lockout handle 127 moves into its dotted line position in response to a recloser lock out, it pulls the actuator 132 to the left, forcing the auxiliary latch 120 counterclockwise about its pivot 124 into latching relationship with the latch roller 48. Thus, when the recloser is locked out, the closing spring 44 is blocked from being released.

When the handle 127 is returned to its solid line position to restore the recloser to the line so as to reenergize the line, a reset spring 133 moves the latch actuator 132 back into its solid line position shown in FIG. 5. This allows the latch-reset spring 122 to begin driving the latch 120 out of its latching position. The time required for the latch-reset spring 122 to drive the latch out of its latching position is controlled by suitable timer 135 that is coupled to the latch 120. Upon the expiration of a preselected interval determined by the timer 135, the latch 120 reaches its normal, or disabled, position shown in solid lines in FIG. 5. The closing spring 44 is then free to discharge to produce a switch-closing operation should it be called upon to do so by the zero-phase-sequence sensitive control means for the main latch 50. It is to be understood that the timer 135 is so constructed that it does not interfere with motion of the auxiliary latch 120 into its latching position in response to a recloser lockout.

In view of the above description, it will be apparent that the latch 120 prevents the fault-imposing switch 30 from being closed for a predetermined interval following return of recloser to the line after lockout. At the expiration of this interval, the latch 120 is moved into its normal disabled position, to permit a closing operation of the switch 30 to occur if the main latch 50 should be tripped in response to a predetermined value of zero-phase-sequence current. Thus, during the period when the latch is in its latching position, the switch 30 is not capable of responding to zero-phase-sequence current to effect opening of the reclosers 11, 12 and 13. It is to be understood, however, that the reclosers 11, 12 and 13 are still capable during this interval of opening in response to overcurrents since such overcurrents will energize their opening coils 15 to produce opening.

While we have shown and described a particular embodiment of our invention, it will be obvious to those skilled in the art that various changes and modifications may be made without departing from our invention in its broader aspects. We, therefore, intend in the appended claims to cover all such changes and modifications as fall within the true spirit and scope of our invention.

What we claim as new and desire to secure by Letters Patent of the United States is:

1. A fault-imposing switching arrangement for a polyphase A.-C. power system, comprising:
   (a) a plurality of reactors, one for each phase of said system,
   (b) a normally-open switch operable when closed to establish a circuit between each of said phases and an electrically-common point through the reactor individual to said phase,
   (c) stored-energy means operable upon discharge to drive said switch into closed position,
   (d) latch means for holding said stored-energy means in a charged condition and releasable to effect discharge of said stored-energy means and resultant closing of said switch,
   (e) means sensitive to the zero-phase-sequence component of current in said power system for releasing said latch in response to zero-phase-sequence current of a predetermined minimum value in said power system,
   (f) magnetic means energized by the current flowing through said switch upon switch-closing to hold said switch closed while current flows through said switch,
   (g) means operated by current through said switch for recharging said stored-energy means,
   (h) and means for opening said switch when the current flow through said switch ceases.

2. A fault-imposing switching arrangement for a polyphase A.-C. power system, comprising:
   (a) a plurality of reactors, one for each phase of said system,
   (b) a normally-open switch operable when closed to establish a circuit between each of said phases and an electrically-common point through the reactor individual to said phase,
   (c) means for closing said switch in response to a zero-phase-sequence component of current of a predetermined minimum value in said power system,
   (d) magnetic means energized by the current flowing through said switch upon switch-closing to hold said switch closed while current flows through said switch,
   (e) and means for opening said switch when the current flow through said switch ceases.

3. The arrangement of claim 2 in which the reactors are of such impedance that substantially equal impedance at normal power frequency will be present between said phase and said electrically-common point when said switch is closed.

4. In a polyphase A.-C. power system that comprises a normally-open switch that is closable to cause a predetermined overcurrent to flow through said system,
   (a) stored-energy means operable upon discharge to drive said switch into closed position,
   (b) latch means for holding said stored-energy in a charged condition and releasable to effect discharge of said stored-energy means and resultant closing of said switch,
   (c) means sensitive to the zero-phase-sequence component of current in said power system for releasing said latch in response to zero-phase-sequence current of a predetermined minimum value in said power system,
   (d) magnetic means energized by the current flowing through said switch upon switch-closing to hold said switch closed while current flows through said switch,
   (e) means operated by current through said switch for recharging said stored-energy means,
   (f) and means for opening said switch when the current flow through said switch ceases.

5. The switching arrangement of claim 4 in which said means sensitive to the zero-phase-sequence component of current comprises:
   (a) a conduit containing an electrically conductive liquid,
   (b) electromagnetic means for producing flux traversing said conduit proportional in magnitude to said zero-phase-sequence component of current,
   (c) means for developing a control current proportional in magnitude to said zero-phase-sequence component of current,
   (d) means for conducting said control current through said conductive liquid transversely to the path followed by said flux in traversing said conduit, whereby liquid is pumped through said conduit at a flow rate varying as a power function of said zero-phase-sequence component of current,
   (e) and means sensitive to the flow of liquid through said conduit for tripping said latch means when a predetermined quantity of liquid has been pumped through the conduit.

6. Means for operating electric switch in response to a predetermined value of zero-phase-sequence current in a polyphase A.-C. system,
   (a) a conduit containing an electrically conductive liquid,
   (b) force developing means connected to said conduit for producing a switch controlling force in response to the reception of a predetermined quantity of liquid from said conduit,
   (c) a magnetic core positioned to direct magnetic flux transversely of said conduit,
   (d) means responsive to the zero-phase-sequence component of current in said system for producing magnetic flux in said core substantially proportional to the magnitude of said zero-phase-sequence component of current,
   (e) means for producing a control current substantially proportional to the magnitude of said zero-phase-sequence component of current and substantially in phase with said flux,
   (f) means for conducting said control current through said conductive liquid transversely to the path followed by said flux in traversing said liquid, whereby liquid is pumped through said conduit into said force developing means at a flow rate varying as a power function of said zero-phase-sequence component of current.

7. Means for operating an electric switch in response to a predetermined value of zero-phase-sequence current in a polyphase A.-C. system,
   (a) a conduit containing an electrically conductive liquid,
   (b) force developing means connected to said conduit for producing a switch controlling force in response to the reception of a predetermined quantity of liquid from said conduit,
   (c) a magnetic core positioned to direct magnetic flux transversely of said conduit,
   (d) means responsive to the zero-phase-sequence component of current in said system for producing magnetic flux in said core substantially proportional to the magnitude of said zero-phase-sequence component of current,
   (e) means sensitive to said magnetic flux for producing a control current substantially proportional to the magnitude of said flux and substantially in phase with said flux,
   (f) means for conducting said control current through said conductive liquid transversely to the path followed by said flux in traversing said liquid, whereby liquid is pumped through said conduit into said force developing means at a flow rate varying as a power function of said zero-phase-sequence component of current.

8. The combination of claim 7 in which said means for producing a control current substantially in phase with said flux comprises a winding coupled to said magnetic core and a reactance element connected in series with said winding for shifting the phase angle of the current with respect to circuit voltage by about 90 degrees.

9. Means for operating an electric switch in response to a predetermined value of zero-phase-sequence current in a polyphase A.-C. system,
  (a) a conduit containing an electrically conductive liquid,
  (b) force developing means connected to said conduit for producing a switch controlling force in response to the reception of a predetermined quantity of liquid from said conduit,
  (c) a magnetic core positioned to direct magnetic flux transversely of said conduit,
  (d) means responsive to the zero-phase-sequence component of current in said system for developing control current substantially proportional to the magnitude of said zero-phase-sequence component of current,
  (e) flux-developing means energized by said control current for producing magnetic flux in said core substantially proportional to said zero-phase-sequence component of current,
  (f) means for conducting said control current through said conductive liquid transversely to the path followed by said flux in traversing said liquid, whereby liquid is pumped through said conduit into said force developing means at a flow rate varying as a power function of said zero-phase-sequence component of current.

10. The combination of claim 9 in which the means for conducting said control current through said conductive liquid is connected in series with said flux-developing means.

11. In a polyphase A.-C. power system,
  (a) a normally-closed circuit breaker openable to de-energize said system,
  (b) overcurrent-sensitive means responsive to a predetermined value of overcurrent to cause said circuit breaker to open,
  (c) a normally-open fault-imposing switch that is closable to cause an overcurrent exceeding said predetermined value to flow through said system, thereby causing said overcurrent-sensitive means to effect opening of said circuit breaker,
  (d) means sensitive to the zero-phase-sequence component of current in said power system for causing said fault-imposing switch to close in response to zero-phase-sequence current of a predetermined value in said system,
  (e) means for locking-out said circuit breaker after a predetermined opening operation thereof,
  (f) means for closing said circuit breaker after a lock-out operation,
  (g) blocking means for preventing said fault-imposing switch from closing for a predetermined interval of time after said circuit breaker is closed following a lock out operation,
  (h) and means for disabling said blocking means at the expiration of said predetermined interval.

12. The apparatus of claim 11 in combination with means for normally maintaining said blocking means in a disabled condition, and means responsive to lock out of said circuit breaker for rendering said blocking means effective to prevent said fault-imposing switch from closing.

13. In a polyphase A.-C. power system:
  (a) a normally-open fault-imposing switch that is closable to cause a predetermined value of overcurrent to flow through said system,
  (b) means sensitive to the zero-phase-sequence component of current in said power system for causing said switch to close in response to zero-phase-sequence current of a predetermined value in said system,
  (c) blocking means for preventing said fault-imposing switch from closing for a predetermined interval of time after said system is energized following a prolonged period of system-deenergization,
  (d) and means for disabling said blocking means at the expiration of said predetermined interval thereafter to permit closing of said switch.

14. The apparatus of claim 13 in combination with means for normally maintaining said blocking means in a disabled condition, and means responsive to a condition indicative of a prolonged period of system-deenergization for rendering said blocking means effective to prevent said fault-imposing switch from closing.

References Cited by the Examiner
UNITED STATES PATENTS

| 2,910,626 | 10/1959 | Koros | 317—16 |
| 2,971,128 | 2/1961 | Carlson | 317—59 X |

References Cited by the Applicant
UNITED STATES PATENTS

| Re. 22,872 | 4/1947 | Matthews. |
| 1,747,044 | 2/1930 | Bainbridge. |
| 2,238,570 | 4/1941 | Schweitzer. |
| 2,605,324 | 7/1952 | Madden. |
| 2,810,038 | 10/1957 | Van Ryan et al. |

MILTON O. HIRSHFIELD, *Primary Examiner.*

J. D. TRAMMELL, *Assistant Examiner.*